United States Patent
Lee et al.

(10) Patent No.: US 7,170,866 B2
(45) Date of Patent: Jan. 30, 2007

(54) QUALITY OF SERVICE ENHANCEMENTS FOR WIRELESS COMMUNICATIONS SYSTEMS

(75) Inventors: William C. Y. Lee, Danville, CA (US); Jau Young Lee, Pleasanton, CA (US)

(73) Assignee: Cello Partnership, Bedminster, NJ (US)

( * ) Notice: Subject to any disclaimer, the term of this patent is extended or adjusted under 35 U.S.C. 154(b) by 886 days.

(21) Appl. No.: 09/733,549

(22) Filed: Dec. 7, 2000

(65) Prior Publication Data

US 2001/0030955 A1    Oct. 18, 2001

Related U.S. Application Data (60) Provisional application No. 60/169,814, filed on Dec. 8, 1999.

(51) Int. Cl.
    *G08C 17/00*    (2006.01)
(52) U.S. Cl. ............... 370/311; 370/318; 370/333; 370/349; 455/13.4; 455/522
(58) Field of Classification Search ........... 370/311, 370/318, 330, 332, 333, 335, 342, 349, 208; 455/7, 13.4, 522
    See application file for complete search history.

(56) References Cited

U.S. PATENT DOCUMENTS

| | | | | |
|---|---|---|---|---|
| 4,829,524 A | * | 5/1989 | Yoshida ................... 714/748 |
| 5,526,409 A | * | 6/1996 | Conrow et al. .......... 379/91.02 |
| 5,960,361 A | * | 9/1999 | Chen .......................... 455/522 |
| 6,084,888 A | * | 7/2000 | Watanabe et al. ........... 370/473 |
| 6,385,180 B1 | * | 5/2002 | Maru .......................... 370/335 |
| 6,397,043 B1 | * | 5/2002 | Kang ........................... 455/69 |
| 6,405,052 B1 | * | 6/2002 | Faber .......................... 455/522 |
| 6,438,119 B1 | * | 8/2002 | Kim et al. ................... 370/335 |
| 6,456,605 B1 | * | 9/2002 | Laakso et al. .............. 370/330 |
| 6,549,785 B1 | * | 4/2003 | Agin ........................... 455/522 |
| 6,633,552 B1 | * | 10/2003 | Ling et al. .................. 370/318 |
| 6,643,275 B1 | * | 11/2003 | Gustafsson et al. ......... 370/328 |
| 6,671,266 B1 | * | 12/2003 | Moon et al. ................. 370/342 |
| 6,718,347 B1 | * | 4/2004 | Wilson ........................ 707/201 |

\* cited by examiner

*Primary Examiner*—Seema S. Rao
*Assistant Examiner*—Shick Hom
(74) *Attorney, Agent, or Firm*—Gates & Cooper LLP (57) ABSTRACT

Various techniques ate present for enhancing the quality of service on wireless communications systems. These techniques determine when errors occur in transmitted frames, then apply Bit Error Rate Power Control, Power-Based Re-Transmission, and Sub-Frame Selective Repeat methods to these errors. Consequently, the handling of frame errors consumes fewer resources in the wireless communications systems.

10 Claims, 12 Drawing Sheets

QUALITY OF SERVICE ENHANCEMENTS FOR WIRELESS COMMUNICATIONS SYSTEMS

CROSS REFERENCE TO RELATED APPLICATIONS

This application claims priority under 35 U.S.C. § 119(e) to U.S. Provisional Patent Application No. 60/169,814, filed Dec. 8, 1999, by William C. Y. Lee and David J. Y. Lee, and entitled "CELLULAR IP FEATURES AND PROTOCOLS," which application is incorporated by reference herein.

This application is related to the following co-pending and commonly-assigned U.S. patent applications:

Ser. No. 09/733,480, filed on Dec. 7, 2000, by Jau Young Lee and William C. Y. Lee, entitled "TUNNELLING WIRELESS VOICE WITH SOFTWARE-DEFINED VOCODERS,"

Ser. No. 09/620,639, filed Jul. 21, 2000, by Jau Young Lee and William C. Y. Lee, entitled "TUNNELLING VOICE OVER THE INTERNET PROTOCOL IN A CELLUAR NETWORK," now U.S. Pat. No. 6,751,207, issued Jun. 15, 2004;

Ser. No. 09/590,346, filed Jun. 8, 2000, by David J. Y. Lee, Ce Xu, and William C. Y. Lee, entitled "MOBILE INTERNET PROTOCOL SQUARE," and Ser. No. 09/589,974, filed Jun. 8, 2000, by David J. Y. Lee, Ce Xu, and William C. Y. Lee, entitled "ARCHITECTURE OF INTERNET PROTOCOL-BASED CELLULAR NETWORK,"

all of which applications are incorporated by reference herein.

BACKGROUND OF THE INVENTION

1. Field of the Invention

The present invention relates to wireless communications systems, and, in particular, to various techniques for enhancing the quality of service on wireless communications systems.

2. Description of the Related Art

Wireless telecommunications technology has been widely adopted for voice applications. Currently, wireless telecommunications technology is gaining momentum in the telecommunications industry for other wireless applications as well, such as data communications. However, voice and data applications place different demands on wireless networks, and require different strategies for ensuring a high quality of service (QoS).

Moreover, wireless networks are beginning to migrate to Internet Protocol (IP) networks for their underlying infrastructure. IP networks have certain advantages over present wireless networks. For example, it is easier to deploy IP networks. In addition, IP networks are more cost-effective in providing wireless services.

Traffic on Internet Protocol (IP) networks, such as the Internet or Intranets, is growing at an exponential rate, as peoples' lives become more tightly interconnected with these networks. Thus, the ability to keep connected with IP networks while mobile is highly desirable. The present invention provides a number of features and functions that enhance the quality of service (QoS) available on IP networks.

SUMMARY OF THE INVENTION

To overcome the limitations in the prior art described above, and to overcome other limitations that will become apparent upon reading and understanding the present specification, the present invention discloses various techniques for enhancing the quality of service on wireless communications systems. These techniques determine when errors occur in transmitted frames, then apply Bit Error Rate Power Control, Power-Based Re-Transmission, and Sub-Frame Selective Repeat methods to these errors. Consequently, the handling of frame errors consumes fewer resources in the wireless communications systems.

BRIEF DESCRIPTION OF THE DRAWINGS

Referring now to the drawing in which like reference numbers represent corresponding parts throughout.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Environment

Figure 1:
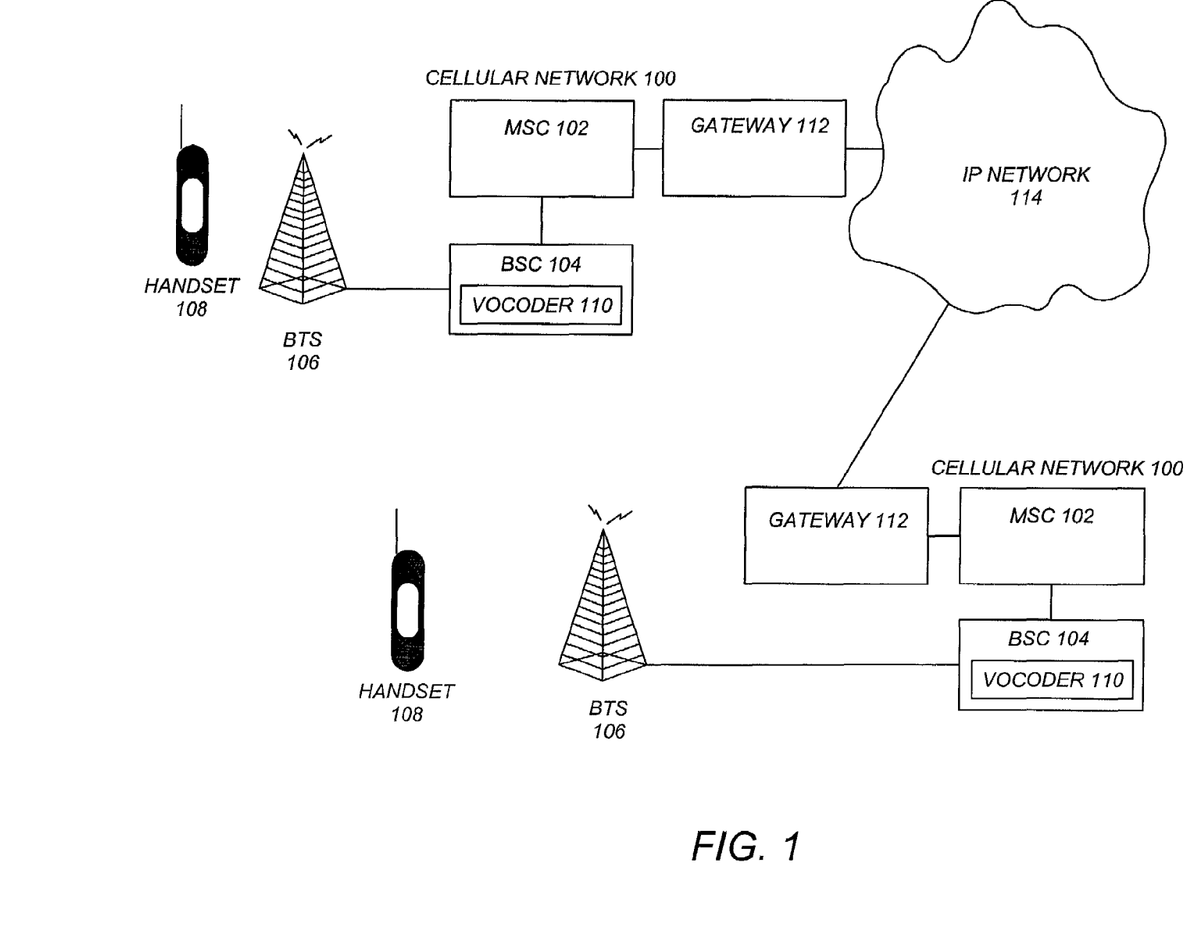
FIG. 1 illustrates an exemplary network configuration that could be used to implement the preferred embodiment of the present invention.

FIG. 1 illustrates an exemplary network configuration that could be used to provide inter-network communications. This exemplary network configurations may be comprised of interconnected cellular networks (e.g., AMPS, GSM, TDMA, or CDMA cellular networks), public land mobile networks (PLMNs), public switched telephone networks (PSTNs), and Internet Protocol (IP) networks.

In the example of FIG. 1, a cellular network 100 includes at least one MSC (Mobile Switching Center) 102, at least one BSC (Base Station Controller) 104, and at least one BTS (Base Transceiver Station) 106 for communicating with one or more handsets 108 or other transceivers. The BSC 104 includes a vocoder 110 for encoding and decoding voice signals received from and sent to the handset 108.

The MSCs 102 of two different cellular networks 100 each connects to a separate Gateway 112 that interfaces into an IP network 114. In this manner, the cellular networks 100 communicate across the IP network 114. Also, in one embodiment, the cellular networks 100 themselves may be IP networks.

Network Protocol

Figure 2:
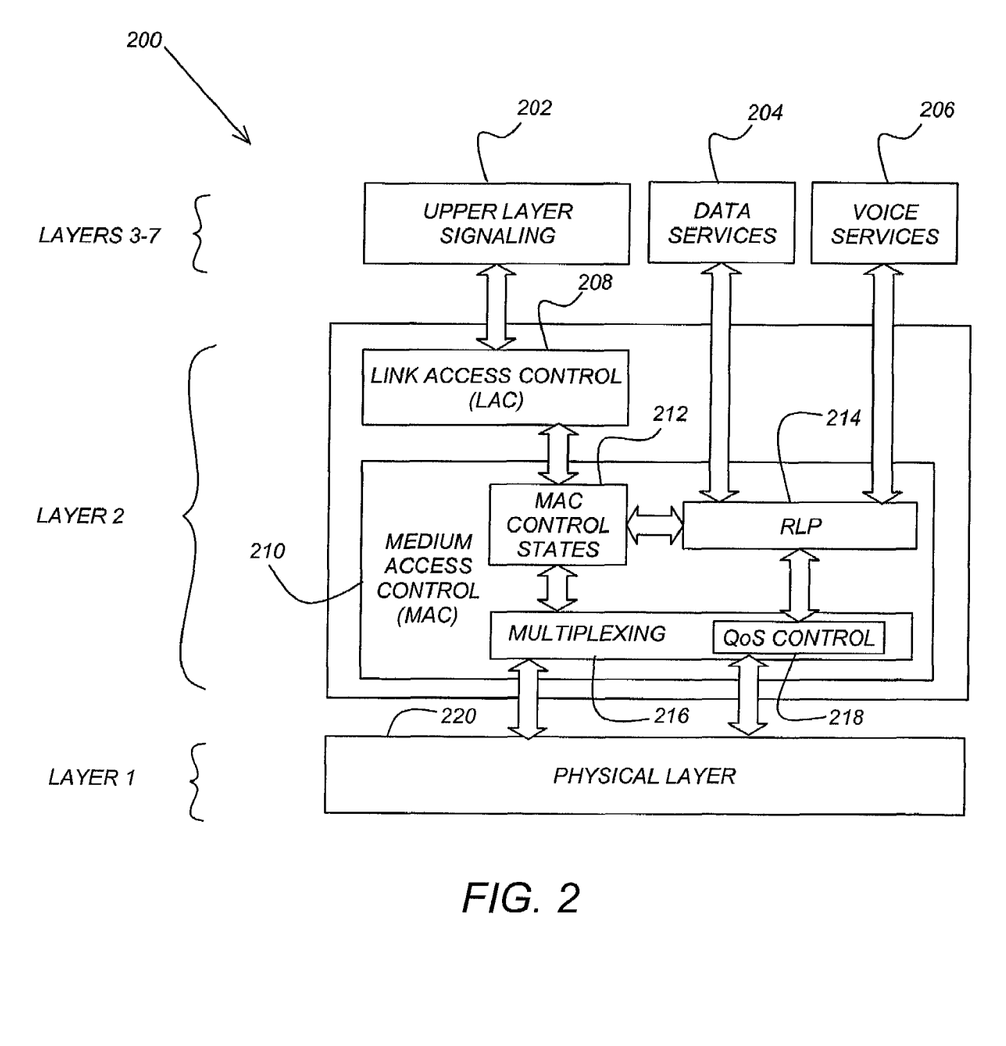
FIG. 2 is a block diagram that illustrates an exemplary network protocol that could be used to provide third-generation (3G) wireless communications for the cellular networks, including both voice and data, according to the preferred embodiment of the present invention.

FIG. 2 is a block diagram that illustrates an exemplary network protocol 200 that could be used to provide third-generation (3G) wireless communications for the cellular networks 100, including both voice and data, according to the preferred embodiment of the present invention. In one embodiment, the protocol 200 may comprise the CDMA 2000 protocol, which is further described at www.3gpp2.org, the web site for the Third-Generation Partnership Project number 2 (3GPP 2).

This protocol 200 loosely follows the OSI (Open System Interconnection) model, in that it is comprised of seven layers: Application (7), Presentation (6), Session (5), Transport (4), Network (3), Data Link (2), and Physical (1). Control is passed from one layer to the next, starting at the Application layer in one station, proceeding to the Physical layer, over the channel to the next station, and back up the layers from the Physical layer to the Application layer.

In the illustration of FIG. 2, note that layers 3–7 are grouped together, and include modules for Upper Layer Signaling 202, Data Services 204, and Voice Services 206.

Layer 2 includes a Link Access Control (LAC) module 208 and a Medium Access Control (MAC) module 210. The MAC 210 includes modules for MAC Control States 212, Radio Link Protocol (RLP) 214, and Multiplexing 216. The Multiplexing module 216 includes a module for Quality of Service (QoS) Control 218. Layer 2 is responsible for node to node validity and integrity of the transmission.

Finally, Layer 1 comprises a Physical Layer 220. In this embodiment, the Physical Layer 220 is also known as an "air link" or "air interface," which generically describes the radio frequency (RF) transmissions. The Physical Layer 220 is responsible for transmitting and receiving bits across the air link. However, this layer 220 has no understanding of the meaning of the bits, but deals merely with the electrical and radio frequency characteristics of the signals and signaling methods. For example, the Physical Layer 220 in the transmitting station is presented a frame and transforms it into an over-the-air waveform, while the Physical Layer 220 in the receiving station transforms the waveform back into a frame.

Bit Error Rate Power Control

The Radio Link Protocol ALP) module 214 needs to be aware of the performance on the air link and adjust accordingly for better bit error rates (BER). The prior art uses cyclic redundancy checks (CRC) to determine whether any bits within a frame are in error. However, the total BER for the frame cannot be determined, since the CRC can only identify whether a frame includes any bits in error, but it does not have the capability to identify how many bits are in error.

The present invention, on the other hand, calculates and/or estimates the BER for a portion of a frame or the entire frame itself, which is then used to provide a QoS assessment for the air link. Once the BER is calculated and/or estimated, adjustments can be made to the transmit power for the air link. This is described in conjunction with FIG. 3.

Figure 3:
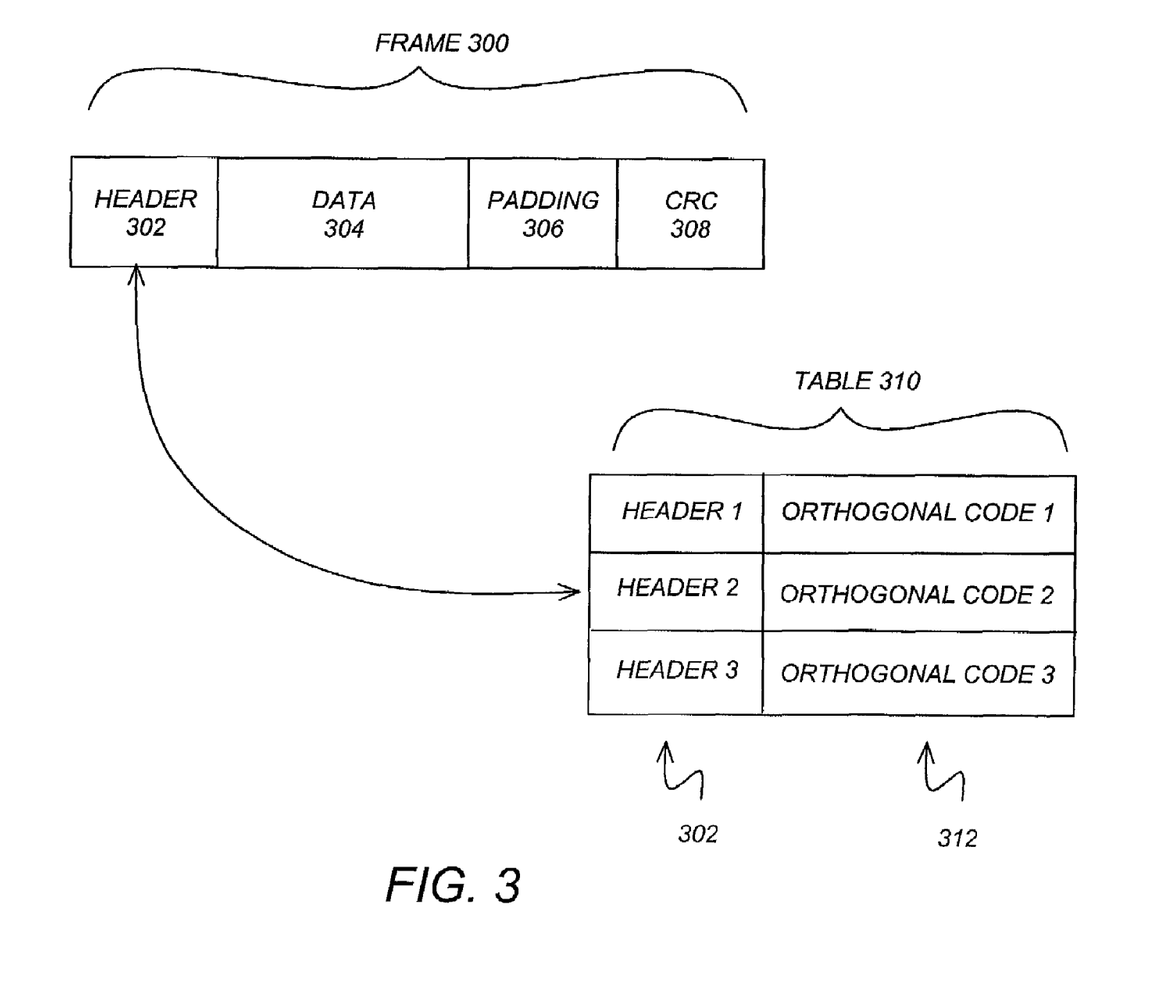
FIG. 3 is a block diagram that illustrates an exemplary frame transmitted by the network protocol according to the preferred embodiment of the present invention.

FIG. 3 is a block diagram that illustrates an exemplary frame 300 transmitted by the network protocol 200 according to the preferred embodiment of the present invention, wherein the frame includes a header 302, data portion 304, padding portion 306, and CRC 308. The BER estimate is performed by replacing the header 302, or other fields, within a frame 300 with an orthogonal code, wherein the BER for the orthogonal code can then be calculated. A table 310 that associates headers 302 to orthogonal codes 312 may be used to map between the actual header 302 and the specific orthogonal code 312. Preferably, the header 302 is mapped to the specific orthogonal code 312 at call set up, and the orthogonal code 312 is used thereafter in place of the header 302 during transmissions.

This orthogonal code 312 makes it easier to calculate and/or estimate the BER. Specifically, because the orthogonal code 312 is a fixed pattern, an exact calculation can be made of the BER within the orthogonal code 312 itself. Thereafter, the BER of the entire frame 300 can be estimated using extrapolation. Once the BER is calculated for the orthogonal code 312 alone, or estimated for the entire frame 300, the transmit power can be adjusted accordingly. Moreover, the mobile phone 108 and/or the network components 102, 104, 106 can perform this BER analysis, and control their own transmit power, or the transmit power of the other side of the communications channel, accordingly.

In an alternative embodiment, the orthogonal code 312 could replace padding bits 306 within the frame 300. Thereafter, the orthogonal code 312 would be used in a manner as described above to perform BER analysis.

Figure 4:
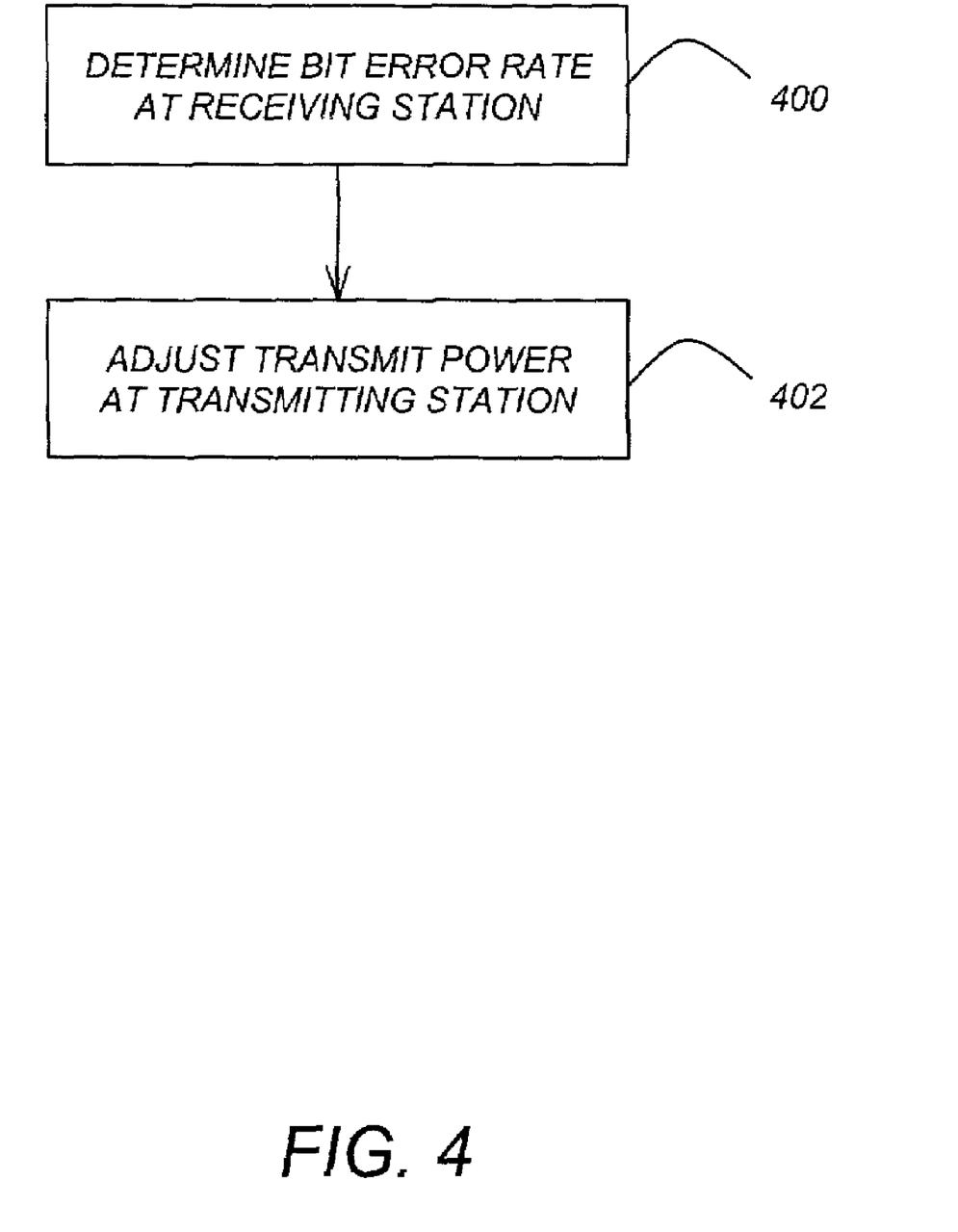
FIG. 4 is a flowchart that illustrates the logic of the bit error rate power control method according to the preferred embodiment of the present invention.

FIG. 4 is a flowchart that illustrates the logic of the BER power control method according to the preferred embodiment of the present invention.

Block 400 represents the receiving station determining the BER for an orthogonal code 312 included in a frame 300 transmitted by the wireless communications system 100. This information is then communicated to the transmitting station.

Block 402 represents the transmitting station adjusting its transmit power for the re-transmission of the frame 300, as well as the transmission of subsequent frames 300, based on the BER determined by the receiving station.

Power Based Re-Transmission

The RLP module 214 is responsible for making "best effort" deliveries of frames to the upper layers 202 of the protocol 200. The term "best effort" means that a frame received with errors will be acknowledged and asked to be retransmitted again. If the frame is received with errors after two tries, then it is delivered to the upper layers 202 of the protocol 202 for further action. Preferably, frames that are re-transmitted because of errors should be transmitted with higher power to ensure the error-free reception of the frame.

Figure 5:
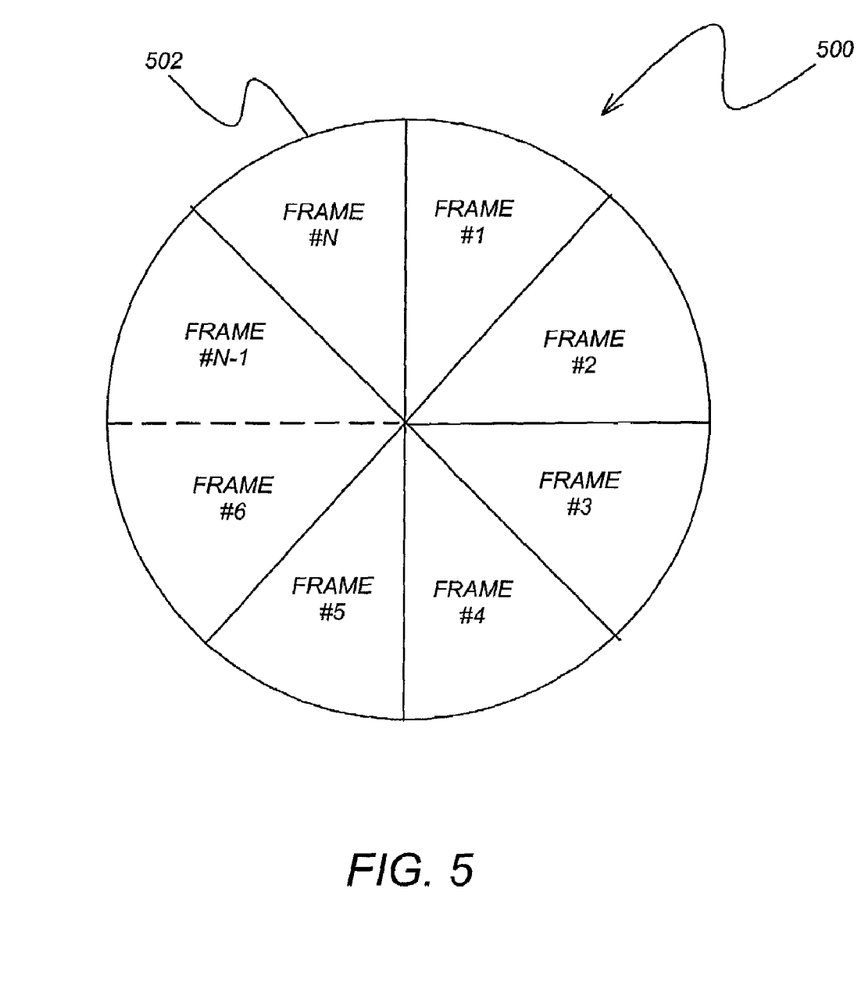
FIG. 5 is a block diagram that illustrates a circular buffer used by the radio link protocol module according to the preferred embodiment of the present invention.

FIG. 5 is a block diagram that illustrates a circular buffer 500 used by the RLP module 214 according to the preferred embodiment of the present invention, wherein the circular buffer 500 stores "N" frames 502 (which in this illustration comprises 8 frames, although the dotted line between frame #6 and frame #N-1 is intended to indicate that the buffet 500 could store any number "N" of frames 502). The circular buffer 500 is also known as a "sliding window" for the reception of frames 502.

If, for example, a frame 502 with errors is received, it is important to clear the error, re-transmit and receive a valid version of the frame 502 into the circular buffer 500, and then remove it from the circular buffer 500 and pass it onto the upper layers 202 of the protocol 200, so that additional frames 502 can be subsequently received into the circular buffer 500. Because of the structure of the circular buffer 500, if an error occurs at the frame #2, it is important to get the error cleared, so that the circular buffer 500 can still work effectively; on the other hand, at frame #N, the error transmission has less impact on the operation and resources of the circular buffer 500.

FIGS. 6A–6D are charts that illustrate how the increase in transmit power is used in an attempt to eliminate errors and ensure the correct reception of frames 502 according to the preferred embodiment of the present invention.

Figure 6A:
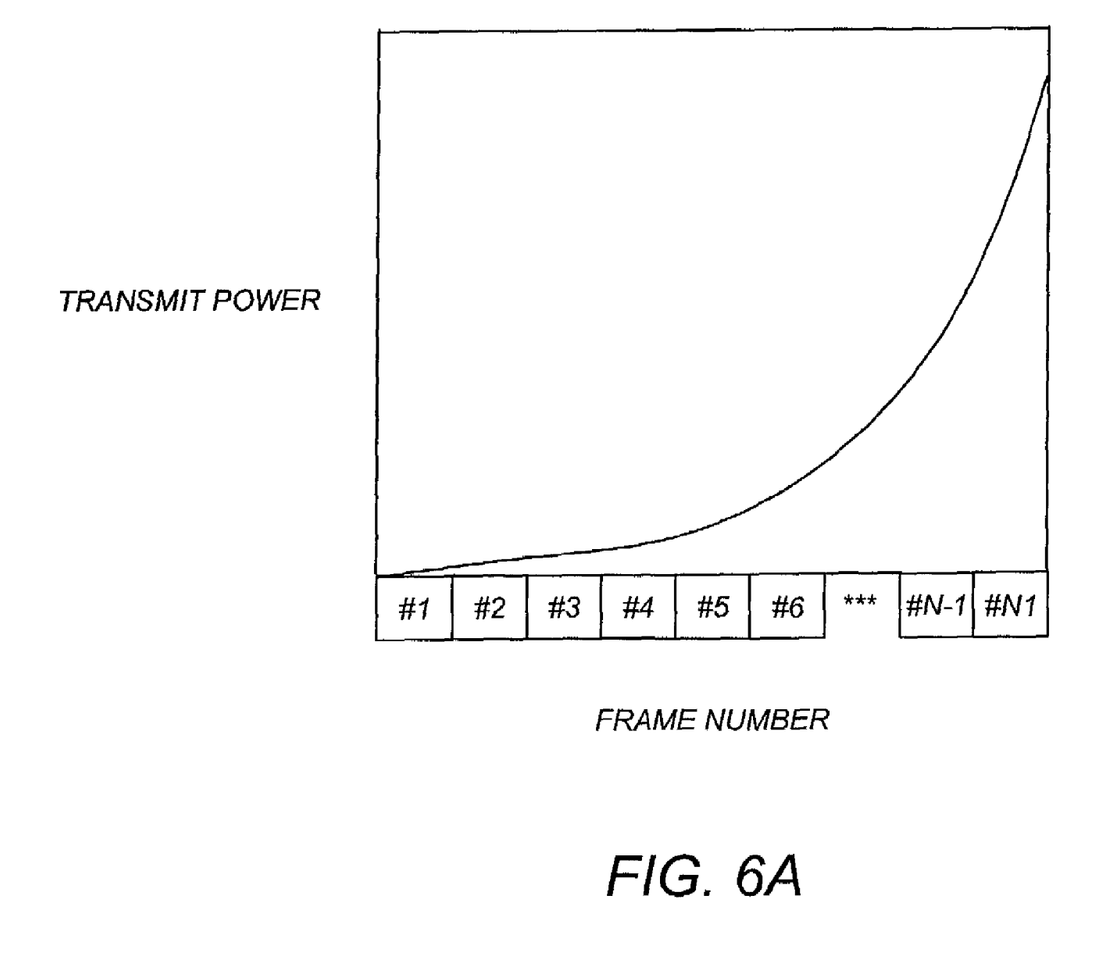
FIGS. 6A–6D are charts that illustrate how the increase in transmit power is used in an attempt to eliminate errors and ensure the correct reception of frames according to the preferred embodiment of the present invention.

FIG. 6A illustrates how the transmit power increases with frame 502 number, e.g., transmit power increases as the amount of transmitted data increases.

Figure 6B:
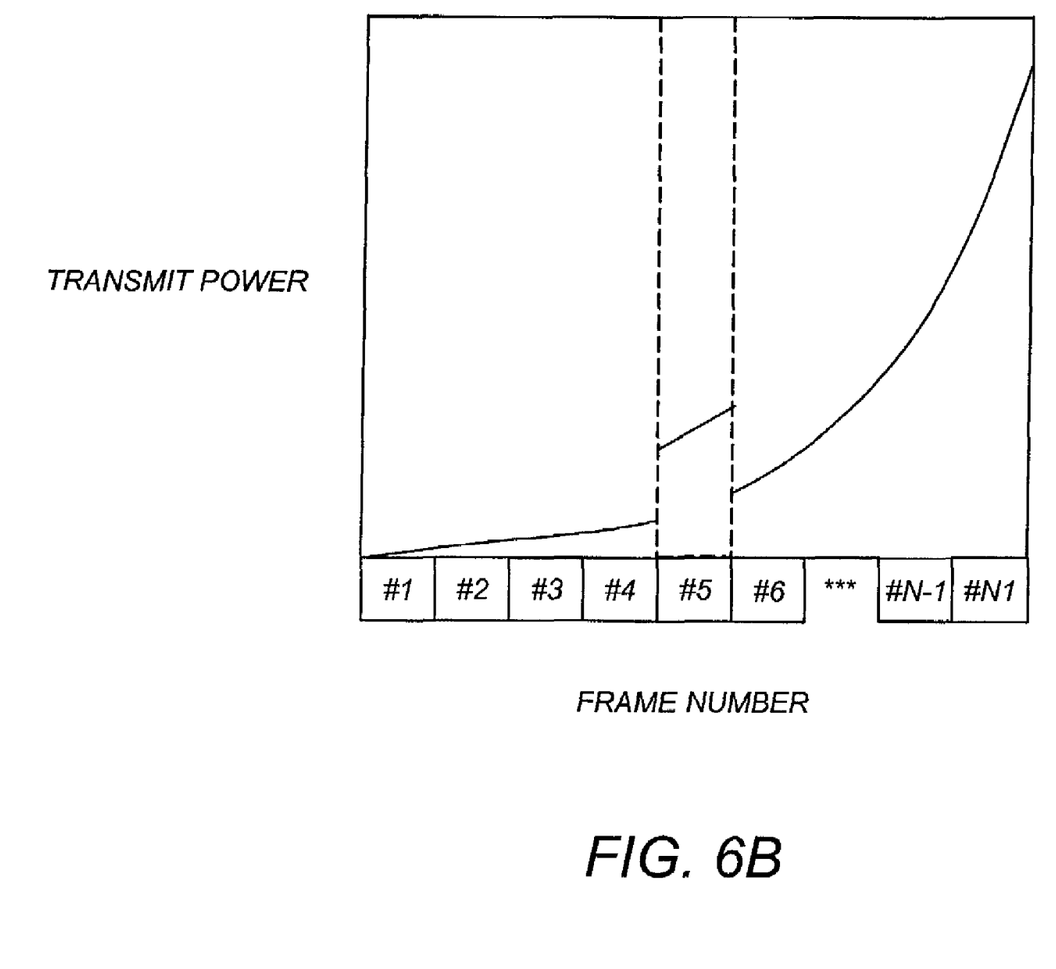

FIG. 6B illustrates how the transmit power is immediately increased in the event that a frame 502 is received in error. Thus, when frame #5 is retransmitted due to its reception with errors, it is immediately re-transmitted with higher power to ensure the error-free reception of frame #5.

Figure 6C:
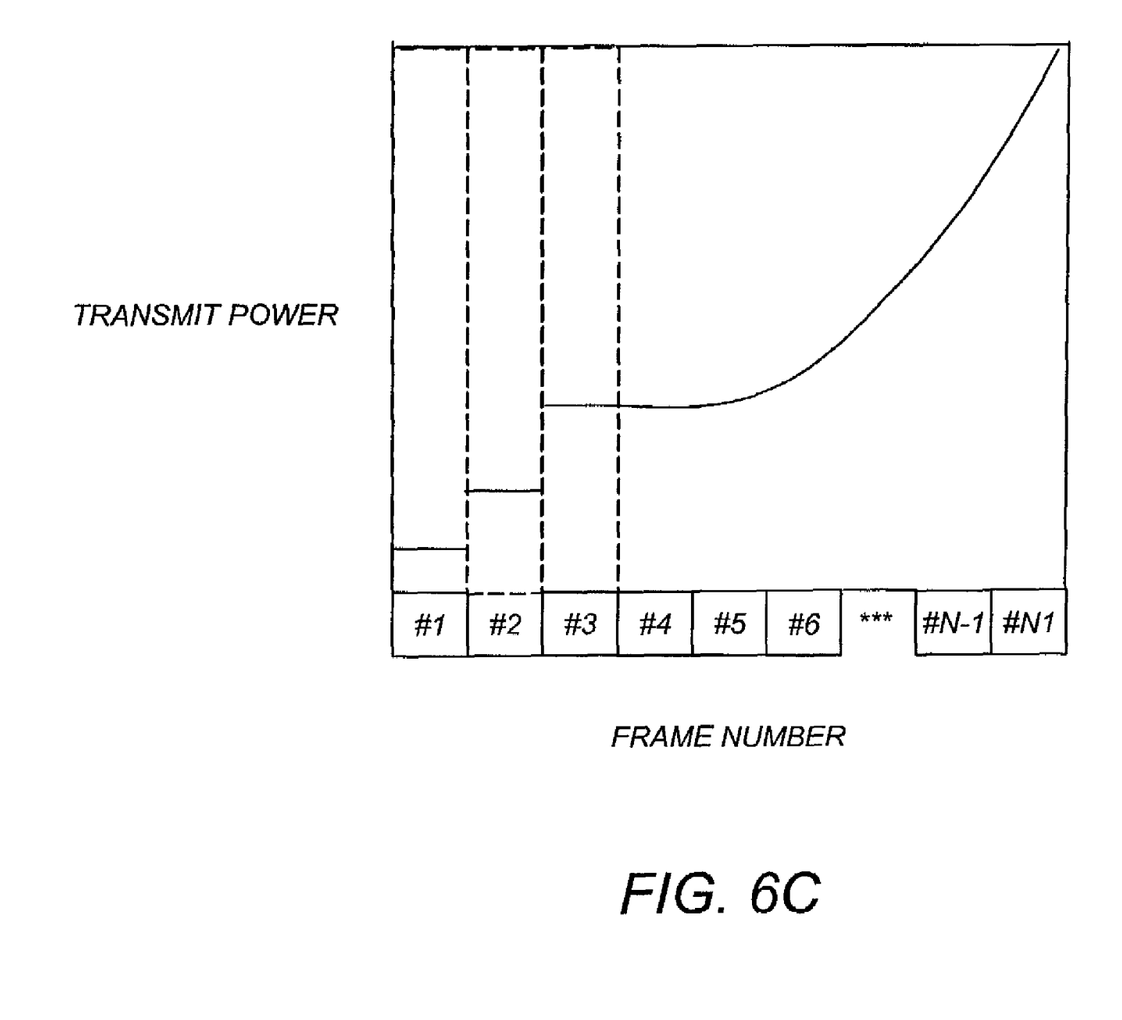

FIG. 6C illustrates how the transmit power is increased by steps when the starting frames 502 are received in error. If the first several frames 502 are received in error, the transmitting station steps up the transmit power immediately to avoid future resource problems.

Figure 6D:
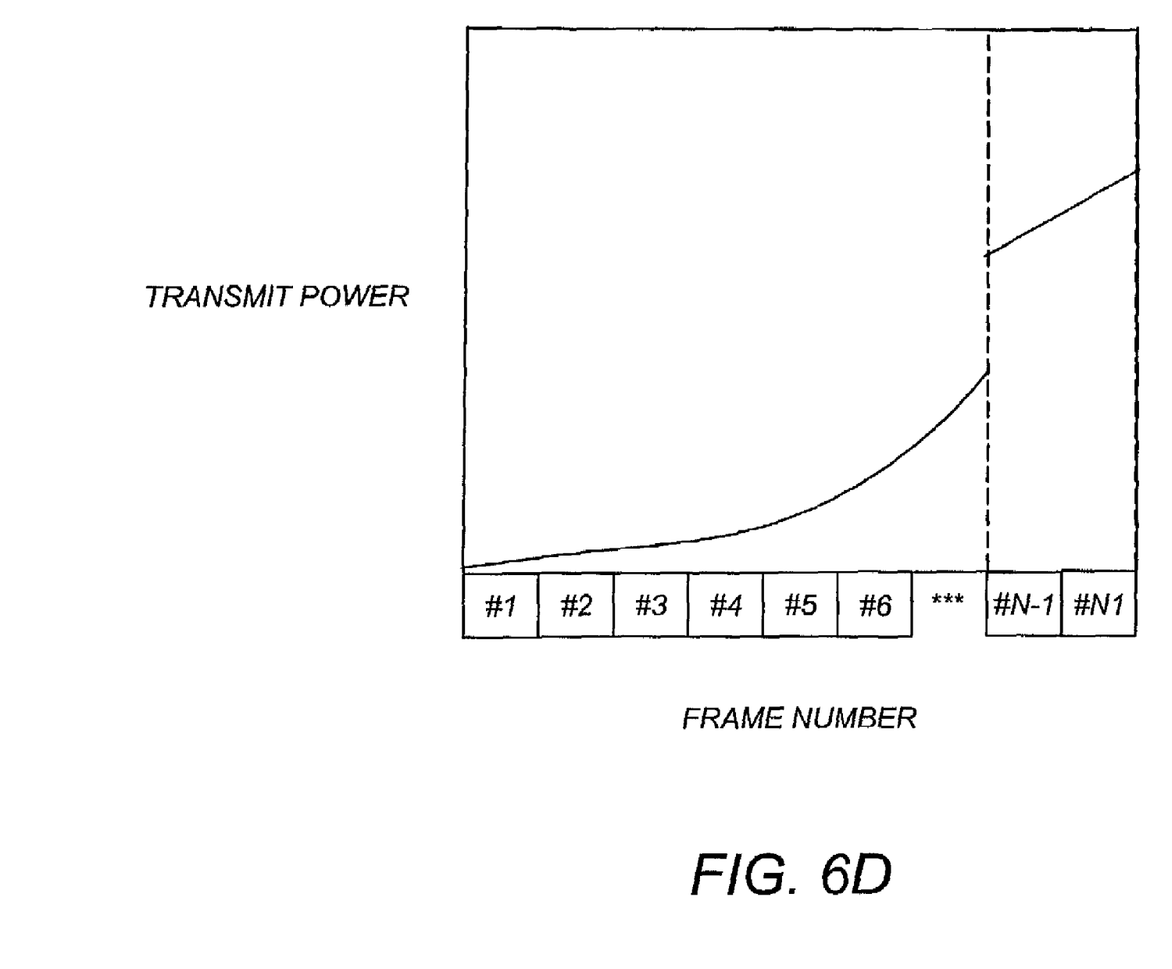

FIG. 6D illustrates how the transmit power is immediately increased when the ending frames 502 are received in error. Thus, when frame #N-1 is re-transmitted due to its reception with errors, it is transmitted with higher power to ensure the error-free reception of frame #N-1, as well as frame #N.

Figure 7:
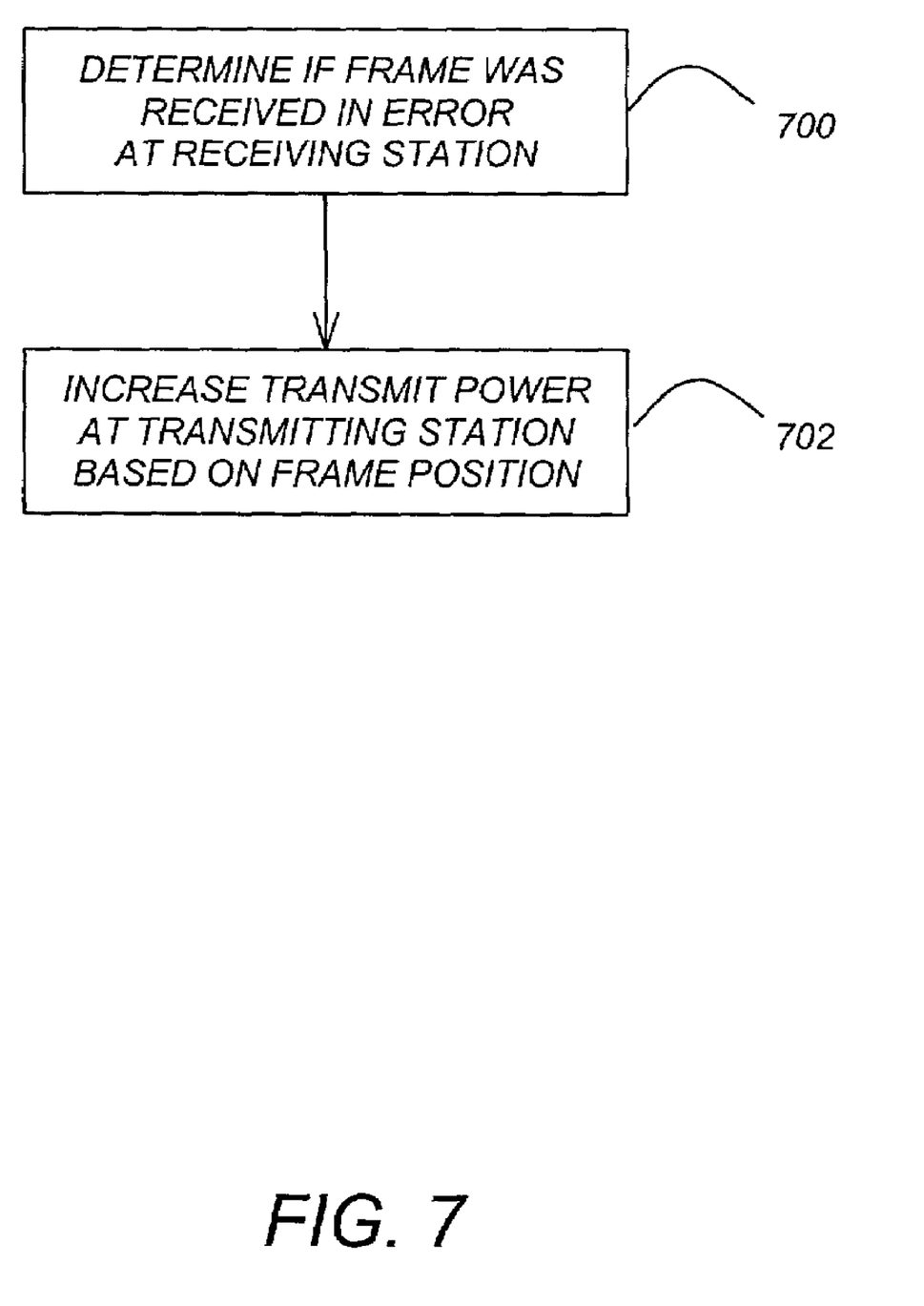
FIG. 7 is a flowchart that illustrates the logic of the power-based re-transmission method according to the preferred embodiment of the present invention.

FIG. 7 is a flowchart that illustrates the logic of the power-based re-transmission method according to the preferred embodiment of the present invention.

Block 700 represents the receiving station determining whether a frame 502 transmitted by the wireless communications system 100 was received in error. This information is then communicated to the transmitting station.

Block 702 represents the transmitting station immediately increasing its transmit power for the re-transmission of the frame 502, as well as the transmission of subsequent frames 502, based on the frame 502 position, i.e., the frame 502 number, the total amount of transmitted data, whether one or more starting frames 502 in the circular buffer 500 were received in error, whether one or more ending frames 502 in the circular buffer 500 were received in error, etc.

Sub-Frame Selective Repeat

There are two standard error correction schemes used in data communications for implementing error control, i.e., "go back n frames" (i.e., re-transmit the last n frames) and "selective repeat" (i.e., re-transmit only the frame with errors). It is generally believed that "selective repeat" is a more efficient scheme for re-transmitting frames with errors. However, the overhead associated with "selective repeat" can be quite significant, since every frame in error needs to be acknowledged before delivery to the upper layers 202 in the correct order or sequence.

Figure 8:
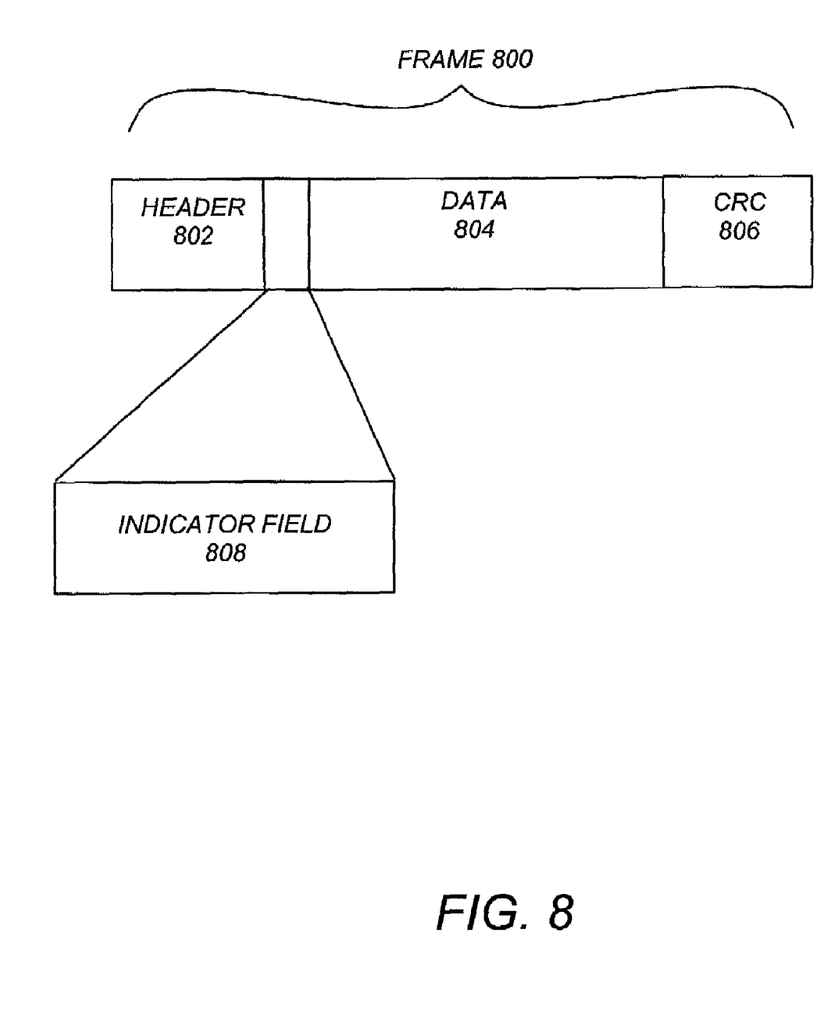
FIG. 8 is a block diagram that illustrates an exemplary frame transmitted by the network protocol according to the preferred embodiment of the present invention, wherein the frame includes a header, data portion, cyclic redundancy check, and an indicator field (which may be part of the header or the data portion)

FIG. 8 is a block diagram that illustrates an exemplary frame 800 transmitted by the network protocol 200 according to the preferred embodiment of the present invention, wherein the frame includes a header 802, data portion 804, CRC 806, and an indicator field 808 (which may be part of the header 802 or the data portion 804). The present invention enhances the traditional selective repeat scheme by performing a "sub-frame" selective repeat. Specifically, each of the bits in the indicator field 808 indicates the parity of some subset of bits in the data portion 804 of the frame 800 (e.g., each bit in a particular position of the indicator field 808 represents the parity for a subset of bits in the same relative position in the data portion 804 of the frame 800). When a parity error occurs as determined by the bits in the indicator field 808, only the associated subset of bits in the data portion 804 of the frame 800 need to be re-transmitted, rather than the entire frame 800 itself.

Figure 9:
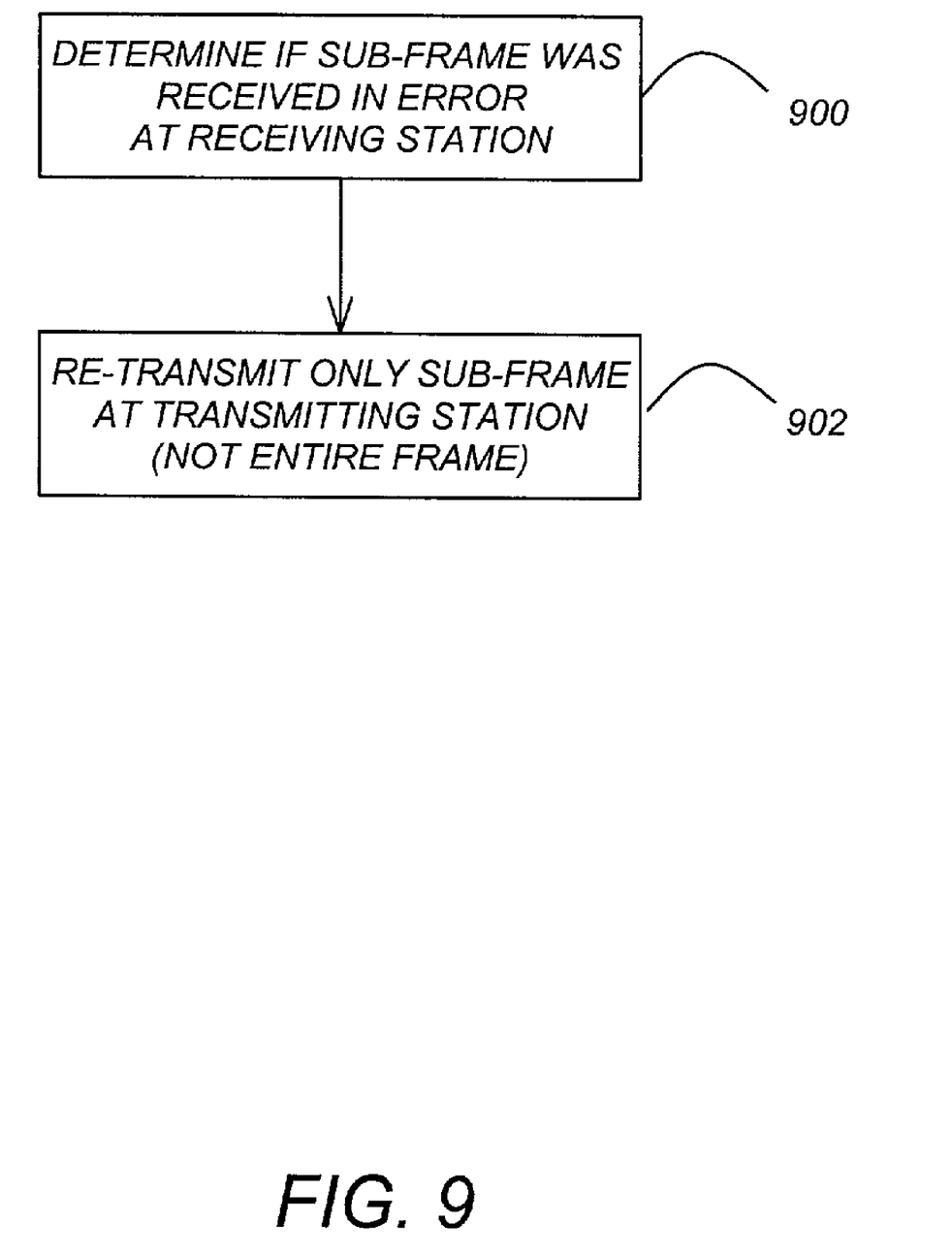
FIG. 9 is a flowchart that illustrates the logic of the sub-frame selective repeat method according to the preferred embodiment of the present invention.

FIG. 9 is a flowchart that illustrates the logic of the sub-frame selective repeat method according to the preferred embodiment of the present invention.

Block 900 represents the receiving station determining whether a portion of the frame 800 transmitted by the wireless communications system 100 was received in error. As noted above, the frame 800 includes an indicator field 808 comprised of a plurality of bits and one of the bits in the indicator field 808 indicates a parity for the portion of the frame 800 received in error. This information is then communicated to the transmitting station.

Block 902 represents the transmitting station re-transmitting only the indicated portion of the frame 800 without re-transmitting the entire frame 800.

Conclusion

This concludes the description of the preferred embodiment of the invention. The following describes some alternative embodiments for accomplishing the present invention.

Although the network configuration 100 shown in FIG. 1 is indicated as a preferred embodiment, other network configurations could be used as well. Those skilled in the art will recognize that any number of different network configurations could benefit from the present invention.

Although the CDMA 2000 protocol 200 shown in FIG. 2 is indicated as a preferred embodiment, any number of different protocols could be used with the present invention. Those skilled in the art will recognize that any number of different protocols could benefit from the present invention.

In yet another embodiment, circular buffers 500 need not be used. Those skilled in the art will recognize that any number of different buffers and memory management techniques could benefit from the present invention.

In still another embodiment, different power control methods could be used. The present invention is not intended to be limited to only the methods described herein.

In an alternative embodiment, different ways of indicating sub-frame errors could be used. The present invention is not intended to be limited to only the methods described herein.

In summary, the present invention discloses various techniques for enhancing the quality of service on wireless communications systems. These techniques determine when errors occur in transmitted frames, then apply Bit Error Rate Power Control, Power-Based Re-Transmission, and Sub-Frame Selective Repeat methods to these errors. Consequently, the handling of frame errors consumes fewer resources in the wireless communications systems.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for controlling transmit power in a wireless communications system, comprising:
   (a) replacing at least a portion of a frame with an orthogonal code;
   (b) determining a bit error rate for the orthogonal code in the frame transmitted by the wireless communications system, wherein the determining step further comprises calculating the bit error rate for the orthogonal code and then estimating the bit error rate for the frame based on the calculation; and
   (c) adjusting transmit power in the wireless communications system based on the estimated bit error rate.

2. A method for controlling transmit power in a wireless communications system, comprising:
   (a) replacing at least a portion of a frame with an orthogonal code, wherein the orthogonal code replaces a header in the frame by mapping the header to the orthogonal code using a table, wherein the table associates the header to the orthogonal code;
   (b) determining a bit error rate for the orthogonal code in the frame transmitted by the wireless communications system; and
   (c) adjusting transmit power in the wireless communications system based on the determined bit error rare.

3. The method of claim 2, wherein the mapping is performed at call set up.

4. A method for controlling transmit power in a wireless communications system, comprising:
   (a) replacing at least a portion of a frame with an orthogonal code, wherein the orthogonal code replaces padding bits in the frame;
   (b) determining a bit error rare for the orthogonal code in the frame transmitted by the wireless communications system; and
   (c) adjusting transmit power in the wireless communications system based on the determined bit error rare.

5. The method of claim 1, wherein the estimating step comprises extrapolating the bit error rate for the frame from the bit error rate for the orthogonal code.

6. An apparatus for controlling transmit power in a wireless communications system, comprising:
   (a) means for replacing at least a portion of a frame with an orthogonal code;
   (b) means determining a bit error rate for the orthogonal code in the frame transmitted by the wireless communications system wherein the means for determining further comprises means for calculating the bit error rare for the orthogonal code and means for estimating the bit error rate for the frame based on the calculation; and
   (c) means for adjusting transmit power in the wireless communications system based on the estimated bit error rate.

7. An apparatus for controlling transmit power in a wireless communications system, comprising:
   (a) means for replacing at least a portion of a frame with an orthogonal code, wherein the orthogonal code replaces a header in the frame by mapping the header to the orthogonal code using a table, wherein the table associates the header to the orthogonal code;
   (b) means for determining a bit error rate for the orthogonal code in the frame transmitted by the wireless communications system; and
   (c) means for adjusting transmit power in the wireless communications system based on the determined bit error rate.

8. The apparatus of claim 7, wherein the mapping is performed at call set up.

9. An apparatus for controlling transmit power in a wireless communications system, comprising:
   (a) means for replacing at least a portion of a frame with an orthogonal code, wherein the orthogonal code replaces padding bits in the frame;
   (b) means for determining a bit error rare for the orthogonal code in the frame transmitted by the wireless communications system; and
   (c) means for adjusting transmit power in the wireless communications system based on the determined bit error rare.

10. The apparatus of claim 6, wherein the means for estimating comprises means for extrapolating the bit error rate for the frame from the bit error rare for the orthogonal code.

* * * * *